United States Patent [19]

Hunke

[11] Patent Number: 5,912,980
[45] Date of Patent: Jun. 15, 1999

[54] TARGET ACQUISITION AND TRACKING

[76] Inventor: H. Martin Hunke, 147 Belvedere St., San Francisco, Calif. 94117

[21] Appl. No.: 08/501,944

[22] Filed: Jul. 13, 1995

[51] Int. Cl.$^6$ ............................... G06K 9/62; G06T 7/20
[52] U.S. Cl. .......................... 382/103; 382/165; 348/169
[58] Field of Search .................................... 382/103, 164, 382/165, 169, 236; 348/169, 170, 171, 172, 416

[56] References Cited

U.S. PATENT DOCUMENTS

| 5,280,530 | 1/1994 | Trew et al. | 382/103 |
| 5,323,470 | 6/1994 | Kara et al. | 382/103 |
| 5,430,809 | 7/1995 | Tomitaka | 348/169 |
| 5,473,369 | 12/1995 | Abe | 348/169 |

OTHER PUBLICATIONS

Kay et al. "A Versatile Colour System Capable of Fruit Sorting and Accurate Object Classification" Proc. 1992 South African Symp. on Comm. and Signal Proc., pp. 145–148 Sep. 1992.

Etoh et al. "Segmentation and 20 Motion Estimation by Region Fragments." Proc. Fourth Int. Conf. Computer Vision. pp. 192–199 May 1993.

Dubuisson et al. "Object Contour Extraction Using Color and Motion." Proc. 1993 IEEE Computer Society Conf. Computer Vision and Pattern Recognition, pp. 471–476 Jun. 1993.

Rander "Real–Time Image–Based Face Tracking." CMU, Pittsburgh, PA. pp. 1–51 1993.

Uras et al. "A Computational Approach to Motion Perception." Biological Cybernetics, vol. 60, pp. 79–87 1988.

Govindaraju et al. "Caption–Aided Face Location in Newspaper Photographs." Proc. IEEE–CS Conf. Computer Vision and Pattern Recognition 1989.

Schuster. "Color Object Tracking with Adaptive Modeling." Proc. of the Workshop on Visual Behaviors. pp. 91–96, Jun. 19, 1994.

Duchnowski et al. "Toward Movement–Invariant Automatic Lip–Reading and Speech Recognition." 1995 Int. Conf. on Acoustics, Speech and Signal Processing, pp. 109–112, vol. 1, May 12, 1995.

*Primary Examiner*—Jon Chang
*Attorney, Agent, or Firm*—Rosenfeld & Associates

[57] ABSTRACT

A method for automatically locating a predetermined target class of objects in a video image stream, comprising the steps of determining typical colors found in objects of the predetermined target class, detecting a moving area in the video image stream, determining the colors in the moving area, and determining whether the moving area contains colors similar to the predetermined target class typical colors. Additionally the method allows tracking of such located target objects in subsequent frames of the video image stream based upon the colors in the target objects.

13 Claims, 5 Drawing Sheets

TARGET ACQUISITION AND TRACKING

BACKGROUND

1. Field of Invention

This invention relates to the area of image processing in general and particularly to the processing of images by methods designed to detect, locate, and track distinctive target objects in the image.

2. Discussion of Prior Art

Systems for detecting, localizing, and tracking distinctive targets are used for unsupervised observation applications, videoconferencing, human-computer interaction, and other applications. In general these systems use a video camera to capture a two-dimensional image stream, which is analyzed by a computer system. The methods for analyzing the image stream must solve the following problems:

Detecting and identifying targets: The system must provide a method to detect and identify targets in the camera image. Generally a target class is defined, describing all objects that are considered as targets. For example, defining the target class as human faces would restrict detecting, localizing, tracking of objects to human faces. The initial number of targets in the camera image might not be known, new targets might appear or existing targets disappear in successive camera images. The problem of detecting and localizing targets becomes more difficult if size, orientation, and exact appearance of the targets are not known, for example if a plurality of arbitrary human faces are to be detected in the camera image.

Localizing targets: The system must be capable of localizing targets by determining their position and size in the camera image.

Tracking targets: The position of each detected and localized target must be tracked in successive images, even though this target might be moving, changing its orientation or size by changing the distance to the camera. The system should continue to track targets robustly even if lighting conditions change or the tracked target is partially covered by other objects.

Several techniques of the prior art have been developed in an attempt to address these problems:

Template matching: One or more pre-stored images of objects of the target class are used as templates to localize and track targets in the video stream. To locate a target, the templates are shifted over the camera image to minimize the difference between the templates and the corresponding region of the camera image. If the difference can be made small for one template, the camera image contains the target represented by this template. To track the target, this template is shifted over the region of the subsequent camera image, where the target's position is assumed.

Model matching: A model for the target class is created, containing information about edges, proportions between edges, and other structural information about objects. Targets are located by extracting these features in the camera image and matching them to the target class model. Tracking of targets can be performed with the same method, but the high computational costs of this approach suggest other techniques like template matching for further tracking of targets.

In general, these techniques suffer from several well-known problems:

1. Template matching:
   (a) In many applications pre stored templates call not cover the variety of objects in the target class. For example, the number of templates required to cover all human faces in all sizes, orientations, etc. would be much higher than a real-time tracking system can manage.
   (b) If the pre-stored templates do not cover all objects of the target class, manual operator intervention is required to point out target objects for further tracking.
   (c) Partial occlusions of a tracked target object result in substantial differences between the image of the tracked object and the stored template, so that the system loses track of the target.

2. Model matching:
   (a) The model for the target class can be very complex depending on the geometrical structure of the objects of this class, resulting in high computational costs to match this model against the camera image.
   (b) To extract geometrical structures of the camera image, this image must have a sufficient resolution (for example in order to locate human faces, eyes, nose, and mouth must be detectable as important geometrical substructures of a human face), requiring a high amount of data to process.

A fundamental problem of the technique of template matching becomes obvious when locating arbitrary objects of the target class for further tracking using templates. The templates must cover all possible appearances, orientations, and sizes of all objects of the target class in order to locate them. Because this requirement can not be met in case of eyes and lips of human faces as target class, P. W. Rander (*Real-Time Image-Based Face Tracking*, Carnegie Mellon University, 1993, Pittsburgh, Pa.) requires a user to manually point out these target objects in a camera image in order to generate templates of these objects. These templates are then tracked in subsequent images. U.S. Pat. No. 5,323,470, A. Kara, K. Kawamura, *Method and Apparatus for Automatically Tracking an Object*, uses template matching to automatically track a face of a person who is being fed by a robotics system, requiring a pre-stored image of the person's face but no manual user input. If the distance of the person to the camera is not known, the template and the camera image will not match each other. It is therefore suggested to use a stereo-based vision subsystem to measure this distance, requiring a second camera. Because the requirement of the pre-stored image of the target object, this system is unable to locate arbitrary faces. Another severe problem of this technique is the incapability to adjust to a changing appearance of the tracked object. In order to solve this problem, U.S. Pat. No. 5,280,530, T. I. P. Trew, G. C. Seeling. *Method and Apparatus for Tracking a Moving Object*, updates the template of the tracked object by tracking sub-templates of this template, determining displacements of the positions of each of the sub-templates, and using these displacements to produce an updated template. The updated template allows tracking of the object, though orientation and appearance of this object might change. This method still requires an initial template of the object to be tracked and is incapable of locating arbitrary objects of a target class, such as human faces.

Model matching is successfully used to locate faces in newspaper articles (V. Govin-daraju, D. B. Sher, and S. N. Srihari, *Locating Human Faces in Newspaper Photographs*, Proc. of IEEE-CS Conf. Computer Vision and Pattern Recognition, 1989, San Diego, Calif.). After detecting edges in the image, a structural model is matched against the located features. There are several significant disadvantages and problems with using the technique of matching structural models for localizing and tracking objects. The model for the target class must describe all possible appearances of targets. If targets appear very differently depending on orientation, the model becomes very complex and does not allow efficient real time tracking of targets. The process of model matching itself requires a sufficient resolution of the tracked target in the camera image to allow edge detection and feature matching, resulting in a considerable amount of data to process.

The present invention provides a novel image processing and target tracking system, based on a new scheme of dynamic color classification that overcomes these and other problems of the prior art.

Objects and Advantages

This invention differs fundamentally from conventional image tracking methods of the prior art in that patterns of color and motion are used as the basis for determining the identity of a plurality of individual moving targets and tracking the position of these targets continuously as a function of tine. Specifically, this invention improves on prior art methods in a number of important aspects:

The system can acquire and track targets automatically. Templates or pre-stored images of objects of the desired target class are not necessary.

The system can acquire and track targets in an unsupervised manner. Human intervention is not required to manually select targets.

Size, orientation, and exact appearance of targets need not to be known in order to detect and locate targets.

The system acquires and tracks multiple targets simultaneously.

The described tracking system is capable of rapid adjustments to changing lighting conditions and appearance of the tracked target, such as changes in the orientation.

The computational costs for the methods described in this invention are substantially smaller than those of the prior art, resulting in significantly faster real-time tracking systems.

The system is very resistant to partial occlusions of a tracked target.

The system can be implemented using conventional hardware, such as a common videocamera and workstation or PC-type computer.

Further objects and advantages of this invention will become apparent from a consideration of the drawings and ensuing description.

SUMMARY OF THE INVENTION

This invention provides a novel method, and associated apparatus, for acquiring and tracking images of objects in real time in virtually arbitrary environments. The method comprises the steps of creating a general target color classifier, classifying all colors typical for objects of a target class (such as human faces, etc.) as general target class colors;

detecting target objects of the target class and locating their position in the image using the general target color classifier and the object's motion;

creating an individual target color classifier for each such detected and located target by determining the colors that actually occur in the target, so that this individual target color classifier classifies all colors typical for the individual target as individual target colors;

tracking the position of each target using the individual target color classifier and the target's motion in a search region restricted to an estimated position of the target;

constantly adjusting the individual target color classifier to changing appearance of the target, due to changing lighting conditions or motion and orientation changes of the target.

determining position and size of all tracked targets to adjust position of the camera and zoom lens.

The herein described invention can be used for all applications requiring locating and tracking target objects. The output of the herein described system comprises of control signals to adjust position of the camera and zoom lens, the position of tracked targets, and images of tracked targets. The images of the tracked targets can be used to generate stable image streams of the targets independent of target movement. With human faces as target objects, the system can be used in applications such as videophoning, videoconferencing, observation, etc. The stable image stream of a tracked face can be used for human-computer interaction by extracting lip and eye movement, etc., for communication purposes. Lip movement can be used, for example, as an adjunct input to computer systems for speech recognition and understanding. Eye position can be used, for example, in remote operator eye control systems. Currently developed systems for extracting such information require a speaker to be at pre-defined position and size within the camera image. Furthermore operator intervention is often required to acquire target objects, like lips and eyes. The herein described invention automatically provides a stable image stream of the acquired and tracked target, containing the target at pre-defined size and position independent of target motion. In case of human faces as tracked targets, stable image streams for each located and tracked face are generated, containing a face in pre-defined size and position independent of speaker movements. System for lip reading can use this stable image stream as input containing a seemengly nonl-moving speaker.

DETAILED DESCRIPTION OF PREFERRED EMBODIMENT OF THE INVENTION

Figure 1:
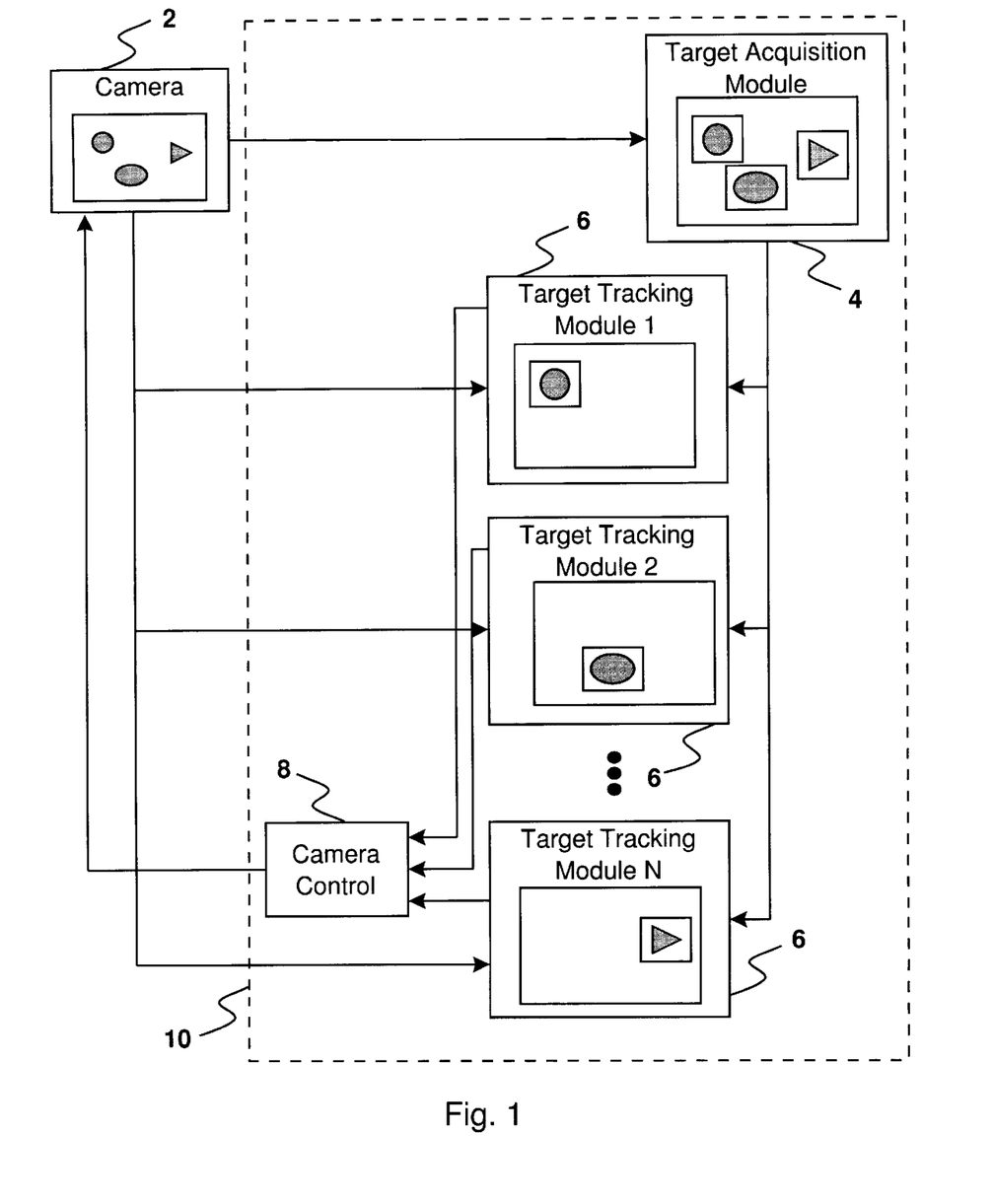
FIG. 1 shows the system configuration of the target acquisition and tracking system according to the present invention.

FIG. 1 shows a system configuration according to the invention. A video camera 2, such as a Sony TR-101 CCD camera, captures images of a scene at a resolution of 150 by 100 pixels and a frame rate of 10 to 50 frames per second.

Each image frame from the camera is digitized by a framegrabber, such as a Media Magic Multimedia Card from Media Magic Inc., in real-time under control of a computer system 10, such as a HP series 700 model 735. Each digitized image is read into the internal memory of the computer system. The sequence of digitized video frames is hereafter termed the image stream. The video camera is equipped with a zoom lens and is mounted on a pan tilt unit, which is under control of the computer system. The method described here is not limited to the frame-rates and resolution described here. Instead of using a video stream captured by a video camera, recorded sequences such as from television or a VCR might be used as well.

A target acquisition module 4 detects, identifies, and locates new objects in the image stream. If a new object belongs to the target class, it is considered as a new target and the target acquisition module creates a target tracking module 6 for it. Each target tracking module tracks the position and size of a single target. Given that target objects move slowly relative to the frame rate of the video, the positions of a given target object in successive video frames will be substantially proximate. Therefore, once a target tracking module has been established for a given target, this module needs only to examine that portion of the image stream that corresponds to the target's area and its immediate vicinity. The portion of the image that corresponds to each target and serves as input to the appropriate target tracking module is termed a virtual camera. Each virtual camera is a smaller rectangular portion of the video image that contains one target. Each virtual camera is translated and zoomed electronically by the associated target tracking module to maintain the given target within the center of the virtual camera's margins. In FIG. 1 the virtual cameras are indicated as boxes surrounding the tracked targets in the target tracking module 6.

The camera control module 8 adjusts the position of the video camera and zoom lens to compensate for changes in the position and size of the tracked targets, for example by considering the following set of rules:

If the size of a tracked target exceeds a given threshold, the caniera zooms out.

If a tracked target is near to one margin of the physical camera without having another tracked target near to the opposite margin, the camera is moved into direction of this target.

If a tracked target is near to one margin of the physical camera and another tracked target is near to the opposite margin, the camera zooms out.

If the size of a tracked target falls short of a given minimum size, the camera zooms in.

If two of the above rules interfere with each other, the tracking module tracking the smaller target is removed from the system, and the set of rules is considered again for the remaining targets.

More specific rules or computation of absolute values for adjustments are not necessary, because the inertia of the physical adjustments is large compared to the frame rate, so that incremental adjustments can be conducted on the fly.

If one of the target tracking modules 6 loses track of its target, that module is removed from the system. If a new target not already being tracked by one of the target tracking modules occurs in the camera image 2, the target acquisition module 4 creates a new target tracking module 6 to track this new target.

Color and movement are the main features used to acquire and track targets. The main advantages of this approach are the independency of these features on orientation of tracked objects and the easy computation of these features even in low resolution images, resulting in a significantly reduced amount of data to process compared to other methods for locating and tracking objects. The target acquisition module 4 detects and locates a new target by searching for moving objects in the camera image 2 having general target class colors. General target class colors are colors typical for the predetermined target class. The target class defines a set of objects that are to be located and tracked if appearing in the camera image. For example, if the system is used to track human faces, the target class includes arbitrary human faces, including all skin-colors, orientation of faces, sizes, etc. The general target class colors are stored as color templates. These color templates can be determined as described in the following section about general target color classifiers or from an operator selected area. The color templates are substantially different to templates used by the technique of template matching, because they are independent of size, position, and orientation of objects. Since human faces come in a variety of skin-types, this example makes clear that the target color templates can include multiple color distributions.

The target tracking modules 6 track a target by searching in a subimage determined by the virtual camera for the specific colors occurring in the tracked object, termed individual target colors. For example, in the application of tracking human faces, the target tracking module searches for the specific skin-color of the tracked individual. While movement is necessary to locate targets in the target acquisition module, the target tracking module does not require movement to track the position of a target. If the target tracking module does not detect motion, the position of the target is the same as in the previous image.

Figure 2:
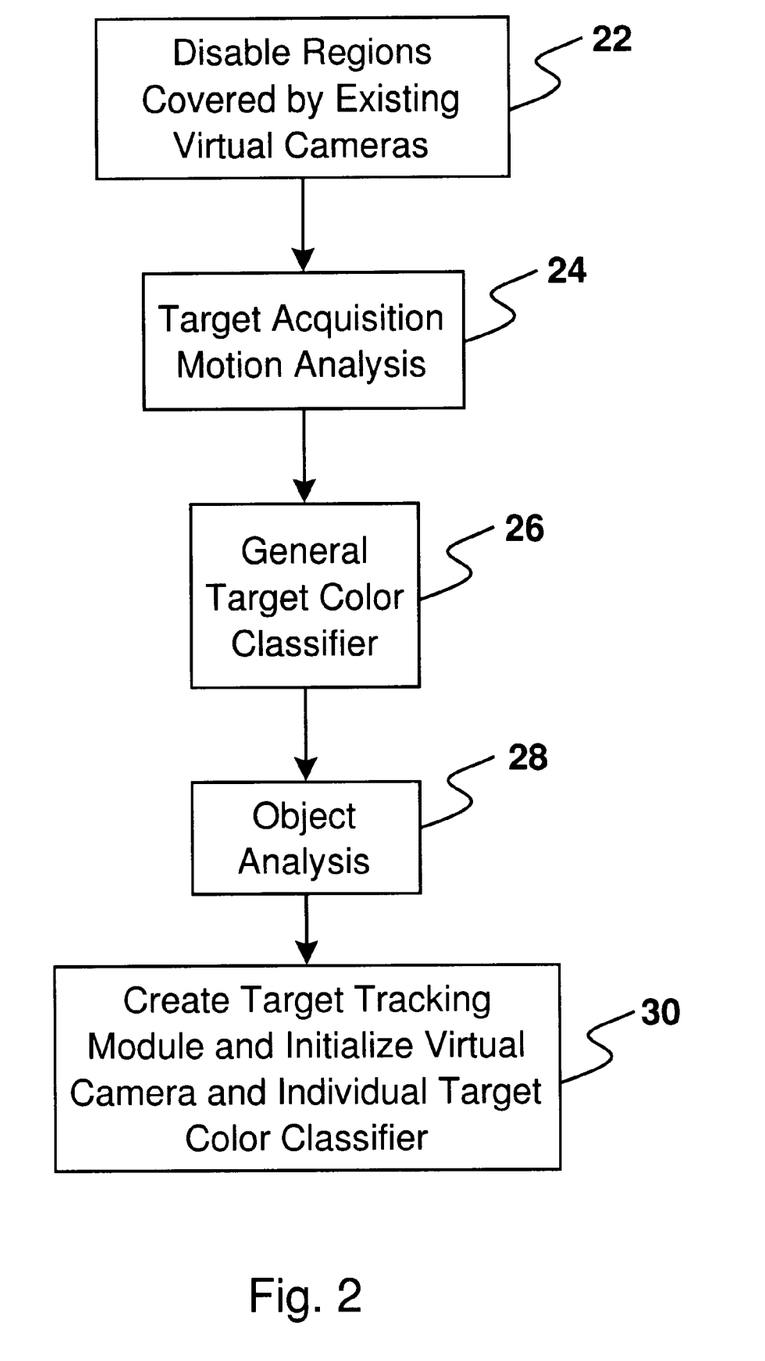
FIG. 2 shows an embodiment of a target acquisition module.

FIG. 2 shows the target acquisition module 4 in detail. Several methods may be used to transfer information between the steps within this module. In the herein described embodiment a blackboard method is used, allowing multiple modules simultaneously reading and writing information on the blackboard. The blackboard is part of the internal memory of the workstation, containing information about which regions of the camera image 2 might contain targets. The target acquisition module 4 initially draws the entire camera image 2 on the target acquisition blackboard, indicating that targets might occur in any part of the camera image. Step 22 erases from the blackboard the regions covered by the virtual cameras 42 of the target tracking modules 6, so that regions containing already tracked targets are not considered in order to locate new targets. To locate a new target, the target acquisition module requires this target to be moving. A target acquisition motion analysis 24 detects motion and erases all regions not containing movement from the target acquisition blackboard, so that these regions are not considered for locating new targets. A general target color classifier (GTCC) classifies colors as typical for the target class or non-typical. In step 26 the GTCC erases from the target acquisition blackboard all regions not containing colors typical for the target class, so that these regions are not considered for locating new targets. The remaining regions on the target acquisition blackboard contain motion and general target class colors outside of regions covered by the virtual cameras of the target tracking modules. In step 28 an object analysis eventually locates target objects in these remaining regions of the target acquisition blackboard. For each located new target a target tracking module 6 is created in step 30 to allow this target to be tracked through successive video-frames. The position and size of the virtual camera 42 of the target tracking module are adjusted, so that the located target is c entered in the virtual camera with enough of a border that the object will remain within the virtual camera in the next video frame. The colors actually occurring in the tracked object are used to create an individual target color classifier (ITCC), that classifies only these colors typical of this specific target.

Figure 3:
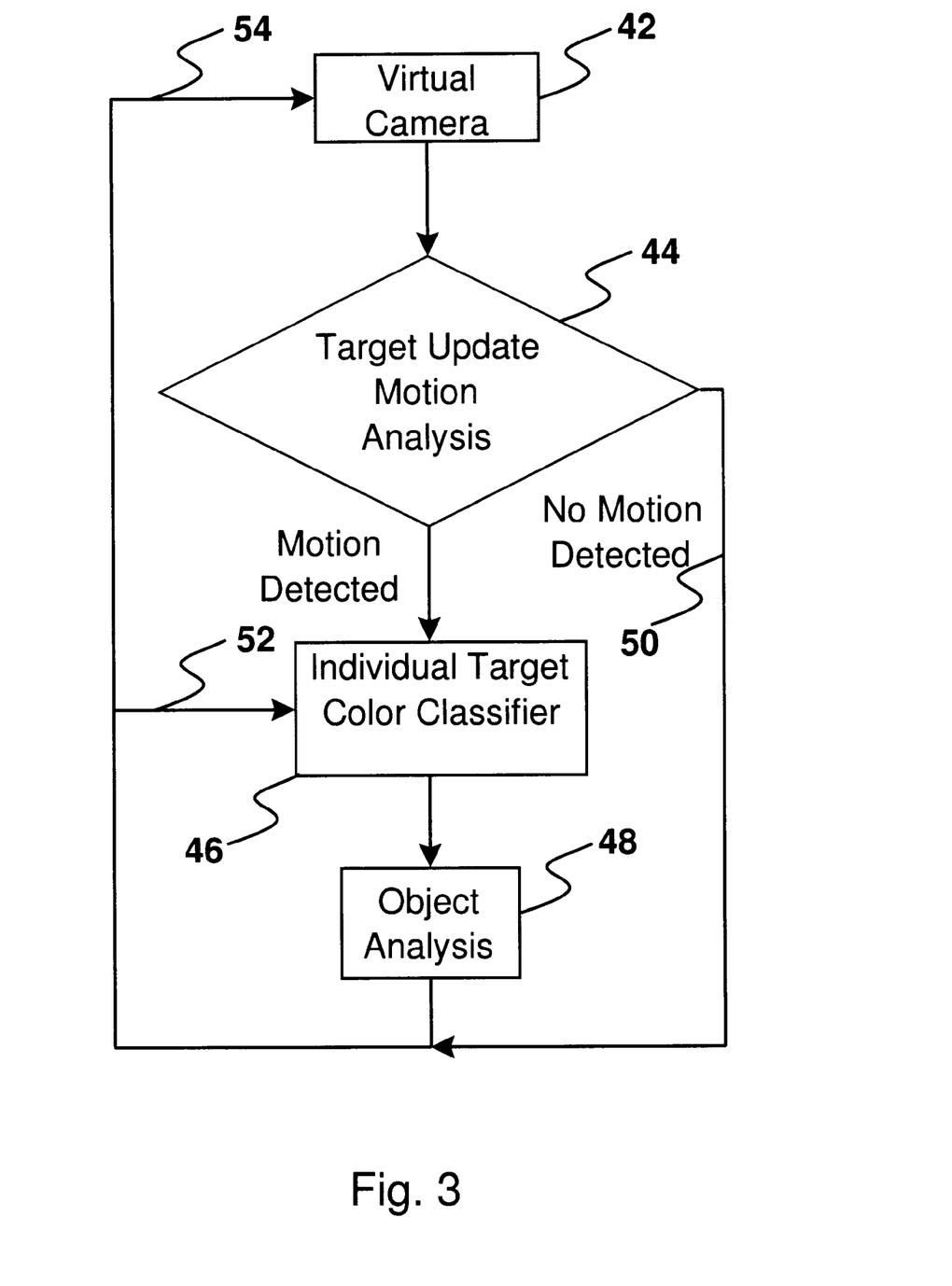
FIG. 3 shows an embodiment of a target tracking module.

The target tracking module 6 is described in detail in FIG. 3. Instead of reading the entire camera image, only the subimage determine by the virtual camera 42 is considered for tracking a target. To transfer information between the parts of the target tracking module the previously described blackboard method is again used. The target tracking blackboard contains information about possible positions of the tracked target. Initially the entire virtual camera 42 is registered on the blackboard as possibly containing the target. In step 44 a target update motion analysis determines motion. If motion is detected, all regions not containing motion are erased from the target tracking blackboard, so that these regions are not considered for tracking the target. The ITCC 46 searches for colors typical for the specific tracked object. All regions not containing individual target colors are erased from the target tracking blackboard, so that only regions containing movement and individual target colors remain on the blackboard. Finally the object analysis 48 locates the tracked target in the remaining regions of the target tracking blackboard. If no motion is detected in step 44, the position and size of the target is the same as in the previous image and steps 46 and 48 are bypassed as indicated in 50. The position and size of the tracked target update the position and size of the virtual camera 54, so that the target will be inside the margins of the virtual camera in the next video frame. The ITCC 46 is updated regarding the colors occurring in the tracked object 52 allowing the system to automatically adjust to changing lighting conditions and appearance of the tracked target. If the ITCC 46 could not locate individual target colors, or the object analysis 48 detects an unrealistic change in the size of the target, the target tracking module assumes the target to be disappeared and is removed from the system.

The following sections describe in detail the preferred embodiments of the target acquisition motion analysis 24, target update motion analysis 44, GTCC 26, ITCC 46, and object analysis 28 and 48 and indicate possible ramifications of these modules. The details of the presented embodiments should not be considered as limiting the scope of the invention, but show one of several possibilities to realize this invention. Other functionally equivalent embodiments will be apparent to those skilled in the art.

A—Target Color Classification

The invention describes method and apparatus to perform two main tasks: Target acquisition and target tracking. In both tasks extracting color is the key factor for fast and reliable operation. The exact appearance of new targets in the camera image is unknown and unpredictable, hence the target acquisition module 4 must detect and identify candidate targets based on features that are independent of size, location, and orientation of objects. Color is such a feature. Once a target is detected and located by the target acquisition module, the target tracking module 6 tracks its position in successive images. In most applications a target will have colors at least slightly different of the colors occurring in the background, so that knowledge of the distribution of colors in the target can be used advantageously to track the target's position. Confusion with similar colors in the background can be avoided by considering motion as an additional feature as described in the next section.

The images obtained from the video camera eventually are represented as a pixel matrix of RGB-values in the internal memory of the computer system. The main difficulty in using color as a feature is the dependency of these RGB-values on operational conditions, such as the characteristics of the video imaging system used including the video camera and framegrabber, and the lighting conditions. A single object might have different RGB-values when images are obtained under different operational conditions, such as using different cameras, framegrabbers or different lighting situations. In order to restrict these dependencies to one module of the system, the scheme of target color classification is introduced. A target color classifier functions as an interface between the RGB-values dependent on operational conditions and an representation independent of these factors, which is used to classify each color pixel as a target color or a non-target color. A color is classified as target color if it is a color typical for objects of this target class. The GTCC classifies general target class colors, which are typical for objects of the target class, while the ITCC classifies individual target colors, which are typical for an individual target. The target color classifier binds all color dependencies at a central module of the system, so that other modules of the system such as the object analysis 28 are independent of operational conditions and use only the abstract information of the target color classifier. For example, if artificial neural networks are used in the object analysis 28 to consider geometrical structures of objects, the weights of the network do not have to be retrained in order to use the system in different operational conditions.

Though the following description of a target color classifier specifies several details of the presently preferred embodiment, these details should not be considered as limitations of the system. Instead the herein described target color classifier is one of several possibilities to abstract from RGB-values to target colors. The target color classifier described here uses distributions of normalized RGB values to determine the most frequently occurring colors in an object, which are then classified as target colors.

The color of light reflected from an object depends on both the color of the object (expressed as percent reflectance for the given color) and the color composition of the source of light. The color of an object is therefore dependent on the composition of colors in the source of light and these percentages. The brightness of an object is proportional to the brightness of the source of light and not a feature of the object itself. The first step of the target color classifier therefore consists of eliminating the brightness information, by normalizing the three-dimensional RGB-values to two-dimensional brightness-normalized color values:

$$(r, g) = f(R, G, B) = \left( \frac{R}{R+G+B}, \frac{G}{R+G+B} \right)$$

The next step in creating a target color classifier is to use a normalized color distribution of a sample image to determine percentages of reflections of a target with a specific source of light. The color distribution $N_{r,g}$ is a histogram of the frequency of occurance of each possible color (r, g) in the sample image. The color distribution is then normalized by transforming the values $N_{r,g}$ into values from [0 . . . 1]. Given a color space of [0 . . . 1], [0 . . . 1], the normalized color distribution $\overline{N}_{r,g}$ is computed as $$\overline{N}_{r,g} = \frac{N_{r,g}}{\max_{i+j \leq l} N_{i,j}}$$

The normalized color distribution $\overline{N}_{r,g}$ will accurately reflect the distribution of colors in the sample image, if the number of pixels in the sample image is large compared to the number of possible colors $$\frac{l^2}{2}.$$

When updating the ITCC 46, a normalized color distribution is obtained using the small image of the tracked target. If the number of pixels in the sample image is small compared to the number of possible colors, the determined histogram does not reflect the color distribution of the object in the sample image. To obtain a valid color distribution, the determined histogram is smoothed by lowpass filtering. Other methods for computing a color distribution include adding a gaussian distribution of a given variance for each pixel of the sample image with the specific color in its mean value.

The normalized color distribution can be used as a target color classifier by classifying a color as a target color if the value $\overline{N}_{r,g}$ exceeds a given threshold. A threshold of 0.2 would classify all colors as target colors which occur at least 0.2 times as often as the most frequently occurring color in the sample image.

Different target color classifiers are used for locating new unknown objects and tracking a specific known target. The target acquisition module 4 locates new targets of a target class using a GTCC 26 to search for colors typical for objects in this target class. The target tracking module 6 uses an ITCC 46 to search for colors typical for the specific target for further tracking. In case of human faces as target class, the GTCC would classify all skin-colors occurring in human beings as general target class colors, while the ITCC would classify only the skin-color of a specific tracked individual as individual target color.

General Target Color Classifier

The purpose of the GTCC is to define an a priori set of colors that are typical for objects of the target class. To generate a GTCC, a color distribution is computed as described above, considering several sample images of objects of the target class taken in the working environment of the system. The sample images are chosen to represent all the colors typical for the target class.

Figure 4:
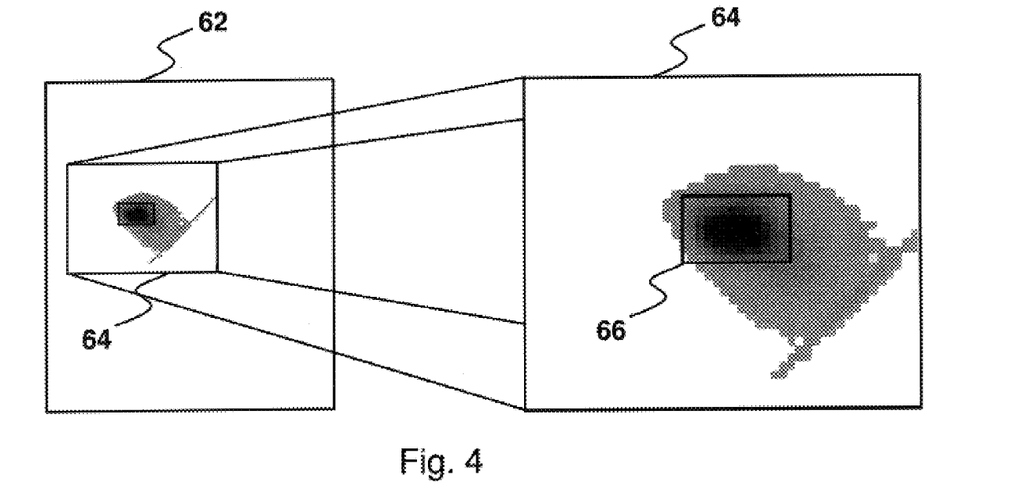
FIG. 4 shows an example of a color distribution used by a general target color classifier.

FIG. 4 demonstrates the general target class color classification with human faces as target class, showing a lowpass filtered normalized color distribution 62 of 30 images of faces, including asian, black, and white individuals. Each of these images consists of a manually select part of one face, containing mainly skill color. Each position in the two-dimensional distribution represents a color (r,g) in the two-dimensional color plane. The grayvalue of each position in the distribution reflects $\overline{N}_{r,g}$, that is how often this specific color occurred in the sample image. Dark spots denote colors occurring most frequently in the sample image, while white spots indicate colors not occurring in the sample image. The color distribution 62 contains a well-defined region of colors occurring frequently in faces, suggesting that seemingly different skin colors differ more in brightness rather than in the color itself. The right part of FIG. 4 contains a magnification 64 of the essential region of 62. The region of dark spots is surrounded by a box 66, indicating the region of colors with $\overline{N}_{r,g}$ exceeding a given threshold, so that they are considered as general target class colors.

The colors in the sample images are dependent on operational conditions, such as the used camera, framegrabber, and lighting conditions while taking these images. If any operational condition changes, the general target color classifier needs to be adjusted. For example, moving from an inside environment with neon lights to an outside environment with sunlight results in a color shift from yellow to blue. The two-dimensional color distributions of images of the same object taken inside and outside are therefore shifted from each other. To adjust the GTCC without recording new sample images from the target class, an image of a reference object can be taken in both environments, giving information about the magnitude and direction of the color shift. The GTCC is then adjusted by shifting the color distribution using this information.

Individual Target Color Classifier

Once a target is located, the target tracking module 6 tracks the position of this specific target using the ITCC 46, which classifies only those colors as individual target colors, which are typical for the specific target under the given operational conditions.

Figure 5:
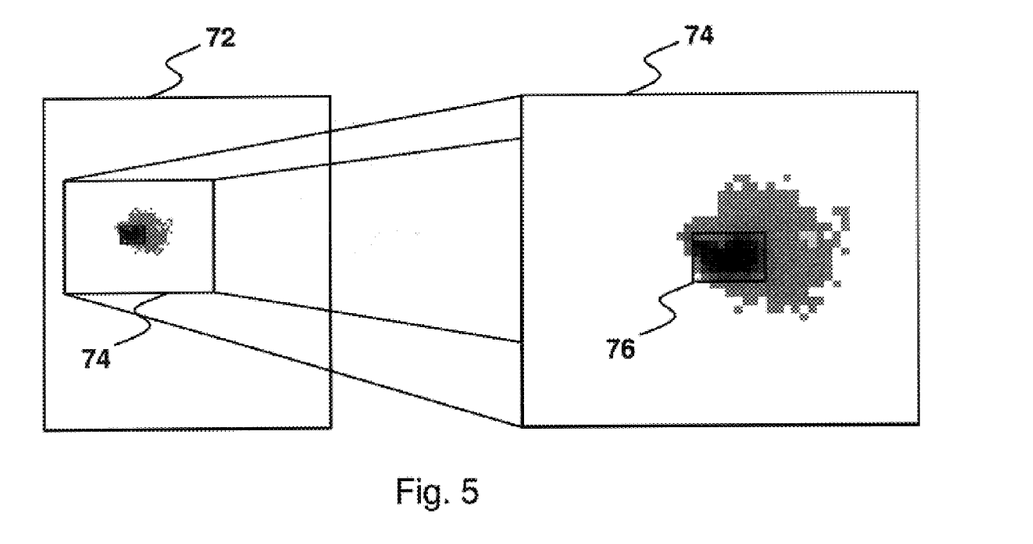
FIG. 5 shows an example of a color distribution used by an individual target color classifier.
Figure 6:
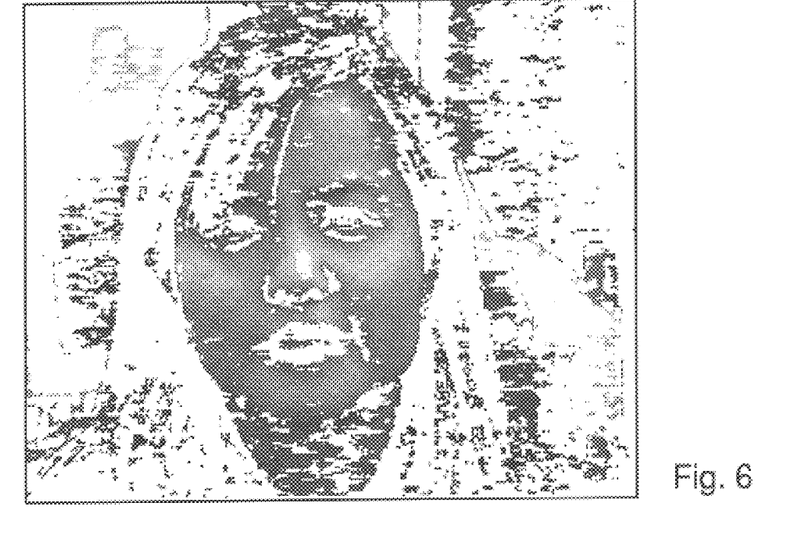
FIG. 6 illustrates the application of an individual target color classifier, detecting skin-like colors as individual target colors.

FIG. 5 and 6 demonstrate the effect of individual target color classification with a human face as example. FIG. 5 shows a lowpass filtered color distribution 72 of an individual face. The right part of the figure shows a magnification 74 of the essential region of this color distribution 72. A rectangular box 76 indicates the colors considered as individual target colors. FIG. 6 demonstrates the effect of using this color distribution as an ITCC. The face in FIG. 6 was used to compute the color distribution 72 in FIG. 5. In FIG. 6 each pixel not having individual target color is replaced with white, so that only regions with skin-color are shown. The regions containing the lips and eyes are not considered having individual target color, because the colors of the lips and eyes occur very infrequently in a face compared to skin color and therefore have low values $\overline{N}_{r,g}$ in the color distribution.

After locating a new target (for example at time $t_0$), the target acquisition module 4 creates a target tracking module 6 to track this target at times $t=t_0+1, t_0+2, \ldots$ using an ITCC 46. The creation of the target tracking module is shown in FIG. 1 as step 30. Because operational conditions, such as lighting conditions, may change during tracking the target, the ITCC 46 needs to be adjusted in step 52 to the colors occurring in the tracked target. For this purpose the normalized color distribution of the image of the tracked target is computed in each image frame during tracking the target. The normalized color distribution of the image of the tracked target at time t is termed C(t). The normalized color distribution used by the ITCC 46 at time t is termed $C_{ITCC}(t)$. The value of $C_{ITCC}(t)$ at some time $t \geq t_0$ is in general a function of the values of C(i) for $t_0 \geq i \geq t$, as well as the value of $C_{GTCC}$, the normalized color distribution used by the GTCC 26:

$$C_{ITCC}(t) = f(C_{GTCC}, C(t_0), C(t_0+1), C(t_0+2), \ldots, C(t))$$

The initial ITCC at time $t_0$ therefore is a function of $C_{GTCC}$ and $C(t_0)$.

Depending on the application, different functions f might be used to compute the current ITCC. The presently preferred embodiment uses a linear combination of $C_{GTCC}$, C(t), and $C_{ITCC}(t-1)$:

$$C_{ITCC}(t) = \begin{cases} \alpha \cdot C_{GTCC} + \beta \cdot C(t_0) & \text{if } t = t_0 \\ \alpha \cdot C_{GTCC} + \beta \cdot C(t) + \gamma \cdot C_{ITCC}(t-1) & \text{if } t > t_0. \end{cases}$$

The values of the parameters $\alpha$, $\beta$, and $\gamma$ depend on the application of the tracking system. For example, if the tracked object is red on the front and green on the back, the GTCC classifies both colors as general target class colors. If the object appears with its red side in the camera image when first being located, adjusting the ITCC only to red as individual target color would result in losing track of the target as soon as it turns around and the green side faces the camera. The ITCC therefore needs to search for colors that are typical for the tracked target though they might not occur in the current image. Using a value $\alpha > 0$, the ITCC considers the general target class colors as classified by the GTCC in addition to the actually occurring colors in the current image of the tracked target. In other applications, for example to locate and track human faces, the GTCC will classify all skin-colors as general target class colors, while the ITCC is adjusted to the specific skin-color of the tracked individual. Once an individual face is located, only the colors actually occurring in this face are valuable to track the face in successive image frames while other skin-colors are not typical for this individual face, so that this application uses a value $\alpha = 0$.

B—Motion Analysis

The tracking system described here does not require targets to move while being tracked, so that a target which is standing still will not be lost. However, for initial target acquisition by the target acquisition module 4 consideration of movement is necessary in applications in which the background night contain colors classified by the GTCC 26 as typical for the target class. For example, if a human face is to be located in front of a wall which is painted in a skin like color but different from the skin-color of the human face, motion is essential to distinguish between the face and the background. The target acquisition motion analysis 24 therefore requires motion in order to detect targets. Once the face is located, the target tracking module 6 adjusts the ITCC 46 to the specific colors occurring in the skill of the located face, classifying the background color as not typical for this specific face. While tracking, consideration of movement still improves reliability. The target tracking module therefore determines motion in the target update motion analysis 44.

Several methods are used in the prior art to detect motion. The herein described embodiment uses a basic but very fast approach to determine motion in an image sequence based on highpass filtering successive images in the time domain, for example by determining the difference between images. Lowpass filtering of the result in the space domain leads to more stable results and call be computed using a local operator such as $$\begin{bmatrix} 1 & 1 & 1 \\ 1 & 1 & 1 \\ 1 & 1 & 1 \end{bmatrix}.$$

The obvious disadvantage of this method is the requirement of a stable background not differing in successive images in order to detect moving objects in the foreground. The background will be unstable if the zoom lens is adjusted or camera and background move relatively to each other.

Motion analysis is therefore disabled during adjustments of the zoom lens or the position of the camera. If relative motion occurs between the background and the camera, for example if the camera is mounted on a moving vehicle, the difference between successive images will reveal differences throughout the image. During situations with unstable background, target acquisition must be suspended, while target tracking is continued. The following sections describe in detail the presently preferred embodiment of the motion analysis modules using the highpass filtering approach. Other embodiments could use other spatial and temporal filtering schemes than the lowpass filtered difference image described above, such as computing gaussian flow (S. Uras, F. Girosi, A. Verri and V. Torre, A Computational Approach to Motion Perception, *Biological Cybernetics*, 1988, vol. 60, pp. 79–87). These other embodiments would also overcome unstable backgrounds, though perhaps at a higher computational cost.

Target Acquisition Motion Analysis

As described above, a lowpass filtered difference image is computed. If the position of the camera or the zoom lens are adjusted or the difference image shows the background to be moving, no new targets are located. Otherwise regions not containing movement are erased from the target acquisition blackboard used to indicate target regions, so that only regions with motion present remain as possible target regions.

Target Update Motion Analysis

The position and size of the virtual camera 42 is constantly adjusted to the position and size of the tracked target. Because the virtual camera might have moved between the last and the current image, computing the difference image must take this movement of the virtual camera into account. Depending on the application of the system, two procedures can be used:

If the target acquisition module 4 and the target tracking modules 6 run simultaneously to detect new targets constantly, the difference image can be computed as the difference between the current image of the virtual camera 42 and the corresponding region of the previous entire camera image read by the target acquisition module.

If only one target is to be tracked, the target acquisition module 4 is suspended once the target is located. The target tracking module 6 reads not the entire camera image 2 but only the virtual camera 42 into the computer. If the virtual camera moved its position or size, the region of the current virtual camera and the region of the virtual camera of the previous image frame do not correspond to the same region of the entire image. This problem is solved by using a reference image, which is obtained by reading and storing the entire camera image once when creating the target tracking module. The difference image can now be computed between the current image of the virtual camera 42 and the corresponding region of this reference image. Overwriting the corresponding region of the reference image by the current virtual camera image updates the reference image. If the position of the camera or the zoom lens are adjusted, the reference image must be replaced by reading a new entire camera image. The reference image is also updated if the difference image shows the entire region of the virtual camera 42 to have changed, indicating a relative movement between the background and the camera.

If no motion is detected, the target has not moved and steps 46 and 48 are bypassed as indicated in step 50 and only the ITCC 46 is updated in step 52 corresponding to the current image of the tracked target. If motion is detected, all regions not containing movement are erased from the target tracking blackboard.

C—Object Analysis

Object analysis takes place in the target acquisition module 4 and the target tracking module 6. In the target acquisition module, object analysis 28 locates targets in the remaining regions on the target acquisition blackboard and determines their size and position to initialize a target tracking module for each located target. In the target tracking module, object analysis 48 locates the tracked object in the remaining regions on the target tracking blackboard and determines its size and position to adjust the virtual camera 42. The term remaining regions refers to the regions on the blackboard after general target class color classification and motion analysis.

The complexity of the object analysis depends largely on the targets and the tracking environment. If motion and color analysis are sufficient to detect a target unequivocally, the object analysis merely needs to detect distinct objects. For example, if the system is used to track a green at least temporarily moving object in an environment with no other moving green objects, motion and general target class color analysis will detect only this object. In the presently preferred embodiment, the target acquisition and target tracking blackboards represent the remaining regions as a set of pixels which passed the motion and color analysis. Detecting an object is defined to mean detecting a coherent set of pixels belonging to one object. The following definition is one example for defining coherent sets of pixels. Other applications might favor a different distance measurement and definition:

Def. 1: Two pixels $p_1$ and $p_2$ with coordinates $(x_{p1}, y_{p1})$ and $(x_{p2}, y_{p2})$ are neighbored, if $\|x_{p1-xp2}\| \leq 1 \wedge \|y_{p1}-y_{p2}\| \leq 1$ is valid.

Def. 2: A set S is coherent, if
1. $S=\{p\}$ or
2. $S=T \cup p$, so that T is a coherent set and $\exists q \square T$: p is neighbored to q.

If motion and color analysis are not sufficient to detect a target unequivocally, a more complex object analysis is required, considering additional features such as the geometrical structure of objects. For example, if the system is used to track human faces, hands and arms will also pass the motion and color analysis and could be mistaken as faces. The object analysis 28 for locating new targets can be extended by pattern classification algorithms to consider the geometrical structure of objects in the remaining regions of the target acquisition blackboard in order to locate a new target instead of simply detecting coherent objects. An object in these regions is then only considered as a new target object, if its structure is typical for objects of the target class. Depending on the target class, different pattern classification algorithms might be chosen. As an example for a very general approach, an artificial neural network (ANN) is described in the following to classify geometrical structures of an object as typical for objects of the target class or not typical.

Figure 7:
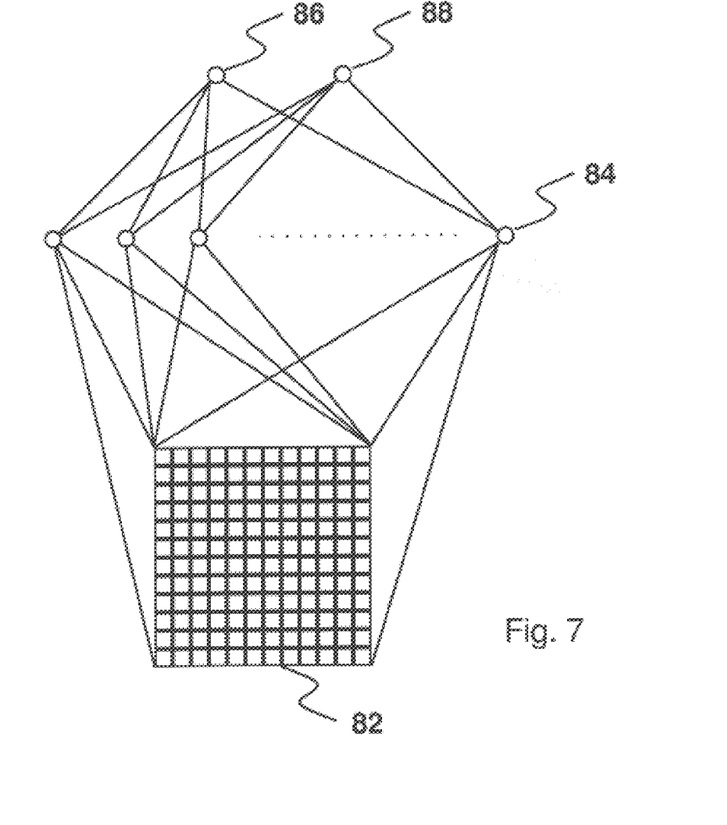
FIG. 7 shows an artificial neural network used for object analysis.

The ANN described here is a multi-layered perceptron trained with backpropagation. The input of the ANN is determined by the part of the object analysis 28 which determines coherent pixel sets as described above. The object analysis might detect multiple coherent pixel sets in the remaining regions of the target acquisition blackboard, by definition distinctive from each other. The ANN receives each of these pixel sets as input to classify its geometrical structure as typical for objects of the target class or not typical. FIG. 7 shows the ANN used in the preferred embodiment. The ANN consists of a two-dimensional input layer 82, a hidden layer 84, and two output neurons 86 and 88. The output neuron 86 has a high activation if the geometrical structure of the object in the input layer is typical for objects of the target class and a low activation if this structure is not typical. These conditions are reversed for the second neuron 88.

To use a coherent pixel set as input for the ANN, a binary matrix is created. The width of the matrix is determined by the largest differences $x_{p1}$ and $x_{p2}$ for any pixels $p_1$ and $p_2$ in the pixel set. The height is determined by the largest differences $y_{p1}$ and $y_{p2}$ for any pixels $p_1$ and $p_2$. Hence the matrix has elements $(x_{p1} \ldots x_{p2}, y_{p1} \ldots y_{p2})$. Each matrix element (m, n) is set to 1 if a pixel p exists in the pixel set with $(x_p, y_p)=(m, n)$ and otherwise to 0, so that the matrix reflects the geometrical structure of the object defined by the pixel set. The matrix is then resized to the size of the input layer of the ANN and the activations of the output layer are determined. The object defined by the pixel set is considered as a new target if the activation of the output neuron 86 is higher then the activation of the output neuron 88.

The ANN is trained using the method of backpropagation, allowing the network to be trained by examples. Each example consists of a matrix for the input layer and the desired two output values for the output neurons. Examples include positive examples of objects of the target class as well as a similar number of negative examples of objects not in this class. Only those objects are chosen for negative examples that have colors similar to the typical colors of objects of the target class, so that the network learns to distinguish between target objects and non-target objects that pass the color analysis. For example, if the network should learn to classify objects as faces or non-faces by considering geometrical structures, positive examples used for network training are faces of different people while negative examples include arms, hands, etc. For each example image, the matrix is computed by applying the GTCC 26 and the object analysis 28 as described above to the example image to determine a coherent pixel set and then filling the matrix corresponding to this pixel set. The desired activations of the output neurons 86 and 88 are 1 and 0 if the example is a positive example, or 0 and 1 otherwise.

I claim:

1. A method for automatically locating a predetermined target class of objects in a video image stream, comprising the steps of:

(a) determining typical colors found in objects of said predetermined target class;

(b) detecting a moving area in said video image stream;

(c) determining the colors in said moving area;

(d) determining whether the moving area contains colors similar to the predetermined target class typical colors;

wherein said moving area contains at least a portion of a target object in said predetermined target class when said moving area contains colors similar to said predetermined target class typical colors.

2. The method recited in claim 1, further comprising the step of tracking said target object in subsequent frames of said video image stream based upon the colors in said target object.

3. The method recited in claim 1, further comprising the steps of:

(e) selecting a search area in a subsequent frame of said video image stream;

(f) determining colors in said search area;

(g) determining whether the search area colors are consistent with the colors in said target object.

4. The method recited in claim 3, further comprising the steps of predicting the location of said target object based upon the prior location of the said target object, wherein the predicted location is within said search area selected in step (e).

5. The method recited in claim 1, wherein a general target color classifier representative of said predetermined target class colors is used by step (d) to determine whether said moving area contains colors similar to said predetermined target class typical colors.

6. The method recited in claim 3, wherein a individual target color classifier representative of the target object colors is used by step (g) to determine whether said target object is in said search area.

7. The method recited in claim 5, further comprising the steps of modifying said general target color classifier in response to at least one operational condition.

8. The method recited in claim 7, wherein said at least one operational condition is lighting condition.

9. The method recited in claim 7, wherein said at least one operational condition are predetermined characteristics of equipment used to generate said video image stream.

10. The method recited in claim 6, further comprising the steps of modifying said individual target color classifier in response to at least one operational condition.

11. The method recited in claim 10, wherein said at least one operational condition is lighting condition.

12. The method recited in claim 5, wherein said general target color classifier is generated by sampling the colors of sample objects in said predetermined target class.

13. The method recited in claim 1, further comprising the steps of:

(e) ascertaining geometrical structures in said moving area; and (f) comparing the moving area geometrical structures to the geometrical structures typical of said predetermined target class to determine if said moving area may contain said target object.

* * * * *